United States Patent
Kim

(10) Patent No.: US 10,529,965 B2
(45) Date of Patent: Jan. 7, 2020

(54) RACK HOUSING ASSEMBLY AND ENERGY STORAGE APPARATUS HAVING THE SAME

(71) Applicant: SAMSUNG SDI CO., LTD., Yongin-si, Gyeonggi-do (KR)

(72) Inventor: Kicheol Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 1093 days.

(21) Appl. No.: 14/816,092

(22) Filed: Aug. 3, 2015

(65) Prior Publication Data
US 2016/0056428 A1    Feb. 25, 2016

(30) Foreign Application Priority Data
Aug. 25, 2014    (KR) .................. 10-2014-0110955

(51) Int. Cl.
*H01M 2/10*    (2006.01)

(52) U.S. Cl.
CPC ...... *H01M 2/1077* (2013.01); *H01M 2220/10* (2013.01)

(58) Field of Classification Search
None
See application file for complete search history.

(56) References Cited

U.S. PATENT DOCUMENTS

| | | | | |
|---|---|---|---|---|
| 6,219,249 B1* | 4/2001 | Tuccio | ................... | H05K 7/183 312/223.2 |
| 6,482,541 B1* | 11/2002 | Bator, Jr. | ............ | H01M 2/1077 429/100 |
| 2002/0098413 A1* | 7/2002 | Hulbert | ................ | H01H 85/044 429/178 |
| 2007/0278915 A1* | 12/2007 | Conrardy | ............ | H01M 2/1077 312/257.1 |
| 2012/0223576 A1* | 9/2012 | Tsutsumi | .............. | H01M 2/206 307/9.1 |
| 2012/0263989 A1 | 10/2012 | Byun et al. | | |
| 2013/0008862 A1 | 1/2013 | Conrardy et al. | | |
| 2016/0268578 A1* | 9/2016 | Ichikawa | .............. | H01M 2/206 |

FOREIGN PATENT DOCUMENTS

| | | |
|---|---|---|
| JP | 2009-021376 A | 1/2009 |
| KR | 10-2004-0025127 A | 3/2004 |

* cited by examiner

*Primary Examiner* — Alix E Eggerding
(74) *Attorney, Agent, or Firm* — Lee & Morse, P.C.

(57) ABSTRACT

A rack housing assembly, including a rack housing that defines a plurality of accommodation spaces opened at a front side to accommodate a plurality of battery trays; and a rack shelf that is in an inner space of the rack housing to house a battery tray and divides the plurality of accommodation spaces, the rack shelf being so dimensioned and positioned in the inner space of the rack housing as to block any mislocated bus member that serially connects each of the plurality of battery trays stacked in the rack housing to each other.

17 Claims, 4 Drawing Sheets

RACK HOUSING ASSEMBLY AND ENERGY STORAGE APPARATUS HAVING THE SAME

CROSS-REFERENCE TO RELATED APPLICATION

Korean Patent Application No. 10-2014-0110955, filed on Aug. 25, 2014, in the Korean Intellectual Property Office, and entitled: "Rack Housing Assembly and Energy Storage Apparatus Having the Same," is incorporated by reference herein in its entirety.

BACKGROUND

1. Field

One or more embodiments relate to a rack housing assembly and an energy storage apparatus having the rack housing assembly.

2. Description of the Related Art

Environmental degradation including resource depletion has led to increased attention in a system capable of storing power and utilizing the stored power efficiently. Additionally, renewable energy may generate energy without causing environmental pollution. An energy storage apparatus may interlink renewable energy, a battery that stores power, and existing power grid systems, and efficiency of the use of energy may be improved. An energy storage apparatus may be used as an uninterruptible power supply to provide emergency power or may provide power, for example, for industrial equipment, in the case of an interruption of a main power source.

SUMMARY

Embodiments may be realized by providing a rack housing assembly, including a rack housing that defines a plurality of accommodation spaces opened at a front side to accommodate a plurality of battery trays; and a rack shelf that is in an inner space of the rack housing to house a battery tray and divides the plurality of accommodation spaces, the rack shelf being so dimensioned and positioned in the inner space of the rack housing as to block any mislocated bus member that serially connects each of the plurality of battery trays stacked in the rack housing to each other.

The rack housing may include a plurality of rack shelves, the plurality of rack shelves including a first rack shelf; and a second rack shelf that overlaps with the first rack shelf.

The first rack shelf and the second rack shelf may be in the rack housing, a first end of the first rack shelf may protrude in comparison with a corresponding first end of the second rack shelf, and a second end of the second rack shelf may protrude in comparison with a corresponding second end of the first rack shelf.

A bus member may be at the second end of the first rack shelf or at the first of the second rack shelf.

The first rack shelf and the second rack shelf may be alternately disposed in the rack housing in a length direction of the rack housing.

At least one selected from a first end of the first rack shelf and a second end of the second rack shelf may be aligned with an end of a power terminal of each of the plurality of battery trays.

The rack shelf may be asymmetrical around a center of each of the plurality of battery trays.

A length of the rack shelf may be shorter than a distance between two power terminals of each of the plurality of battery trays.

Embodiments may be realized by providing an energy storage apparatus, including a plurality of battery trays including power terminals at opposite sides thereof; a rack housing that define a plurality of accommodation spaces opened at a front side to accommodate the plurality of battery trays; a rack shelf that is in the rack housing and sections the plurality of the accommodation spaces to house the plurality of battery trays; and a bus member that connects power terminals of two adjacent battery trays among the plurality of battery trays, a first distance from a center of a battery tray to a first end of the rack shelf being smaller than a second distance from the center of the battery tray to a second end of the rack shelf.

The energy storage apparatus may include a plurality of bus members that connect the two adjacent battery trays, the plurality of bus members including a first bus member that is at the second end of each of the plurality of battery trays and electrically connects the plurality of battery trays to each other; and a second bus member that is opposite to the first bus member with respect to the center of the plurality of battery trays, and connects to the first end of each of the plurality of battery trays.

The first bus member and the second bus member may serially connect the plurality of battery trays.

The energy storage apparatus may include a plurality of rack shelves, the plurality of rack shelves including a first rack shelf; and a second rack shelf that overlaps with the first rack shelf.

The first rack shelf and the second rack shelf may be in the rack housing, a first end of the first rack shelf may protrude in comparison with a corresponding first end of the second rack shelf, and a second end of the second rack shelf may protrude in comparison with a corresponding second end of the first rack shelf.

The bus member may be at the second end of the first rack shelf or at the first end of the second rack shelf.

The first rack shelf and the second rack shelf may be alternately disposed in the rack housing in a length direction of the rack housing.

The first distance may be the same as a distance from the center of the battery trays to each end of the power terminals of the battery tray.

The energy storage apparatus may further include a current blocking device on the bus member.

The bus member may be at the second end of the rack shelf.

The rack shelf may prevent a short of the bus member.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

As used herein, the term "and/or" includes any and all combinations of one or more of the associated listed items. Expressions such as "at least one of" when preceding a list of elements, modify the entire list of elements and do not modify the individual elements of the list.

As used herein, the singular forms "a", "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

It will be understood that although the terms "first", "second", etc. may be used herein to describe various components, these components should not be limited by these terms. These components are only used to distinguish one component from another.

Figure 1:
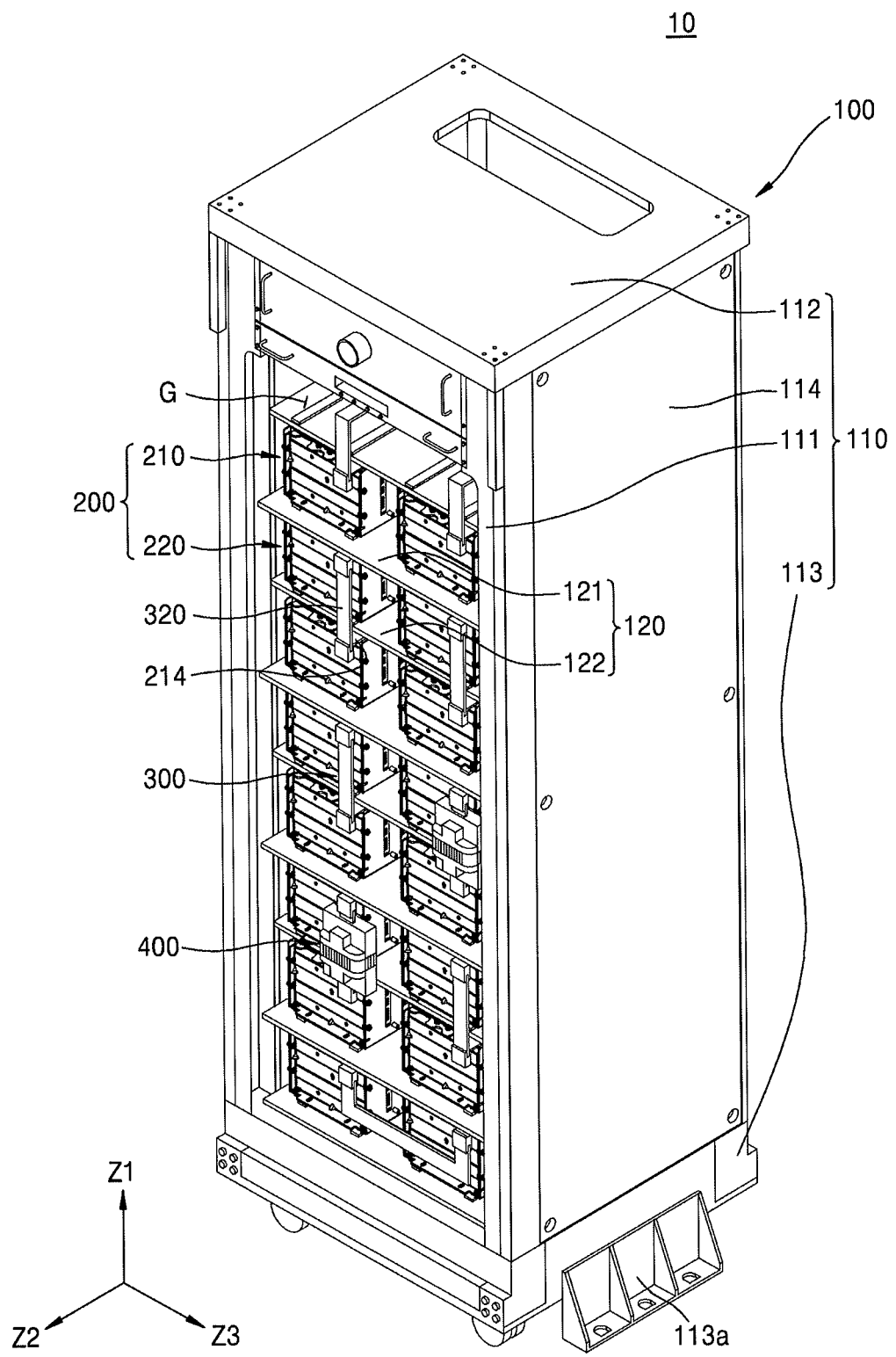
FIG. 1 illustrates a perspective view of an energy storage apparatus according to an embodiment.
Figure 2:
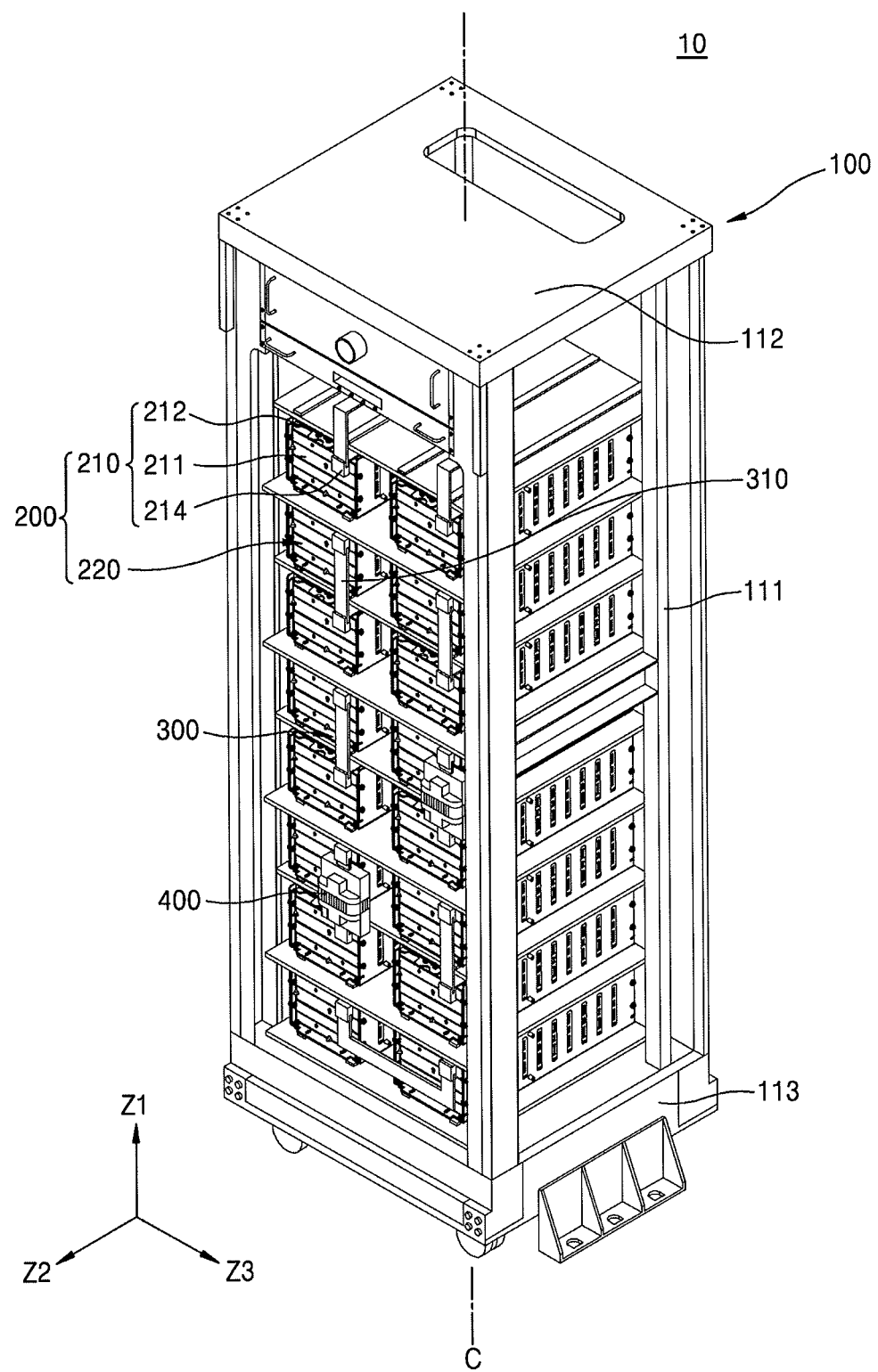
FIG. 2 illustrates a cutaway view of the energy storage apparatus illustrated in FIG. 1.
Figure 3:
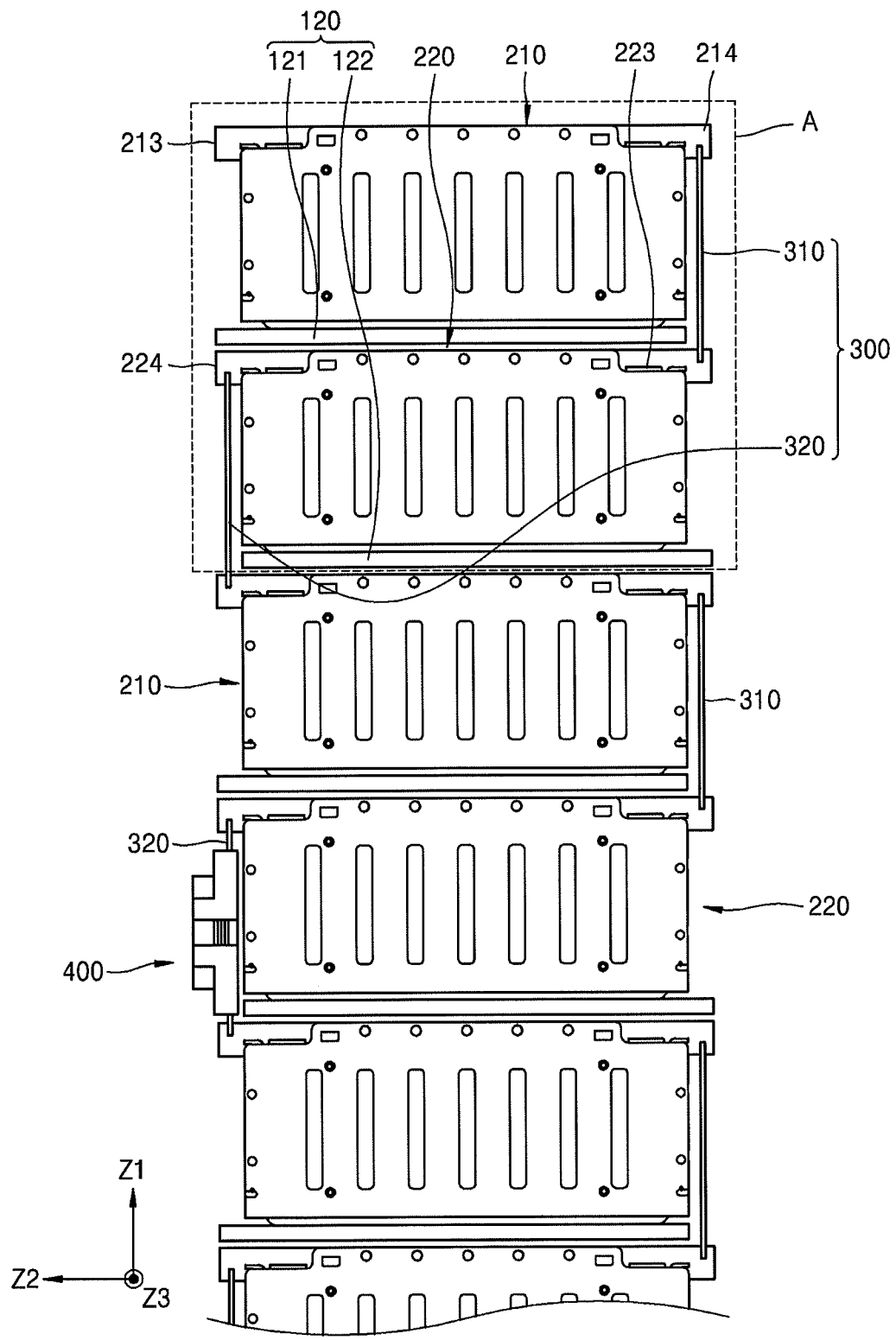
FIG. 3 illustrates a front view of a battery tray and a rack shelf, which are illustrated in FIG. 1.
Figure 4:
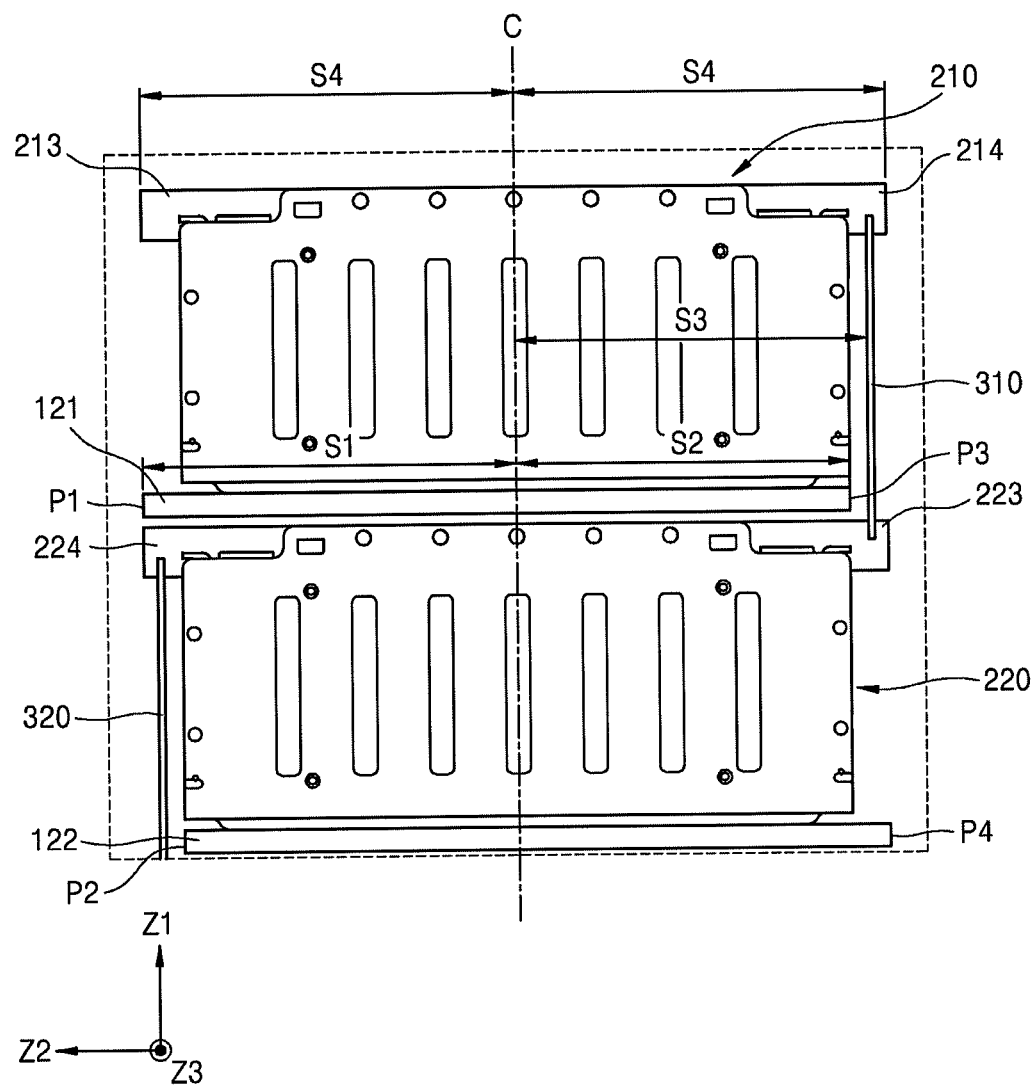
FIG. 4 illustrates a magnified front view of an area A illustrated in FIG. 3.

FIG. 1 illustrates a perspective view of an energy storage apparatus 10 according to an embodiment. FIG. 2 illustrates a cutaway view of the energy storage apparatus 10 illustrated in FIG. 1. FIG. 3 illustrates a front view of some parts of the energy storage apparatus 10 illustrated in FIG. 1. FIG. 4 illustrates a magnified front view of an area A illustrated in FIG. 3.

Referring to FIGS. 1 to 4, the energy storage apparatus 10 may include a rack housing assembly 100 and a plurality of battery trays 200 housed in the rack housing assembly 100.

The energy storage apparatus 10 may include bus members 300 that connect the plurality of battery trays 200. The energy storage apparatus 10 may also include current blocking device 400 mounted on the bus members 300.

The battery tray 200 is a module of a plurality of unit battery packs (not shown) that are packed as a unit, and the energy storage apparatus 10 may be formed by connecting a plurality of battery trays 200 serially and/or in parallel. For example, the battery tray 200 may include a plurality of unit battery packs (not shown) formed in a flat shape and stacked in a horizontal direction Z2. The battery tray 200 may include a power terminal (not labeled) for outputting a discharge current to an external load (not shown) or inputting a charge current from an external power supply apparatus (not shown).

The plurality of battery trays 200 may be provided. The plurality of battery trays 200 may be stacked inside a rack housing 110. For example, the plurality of battery trays 200 may include a first battery tray 210 disposed in an upper portion of the rack housing 110, and a second battery tray 220 disposed under the first battery tray 210.

The first battery tray 210 and the second battery tray 220 may be formed to be the same as or similar to each other. The first battery tray 210 and the second battery tray 220 may be stacked alternately. For example, a second battery tray 220 may be disposed on a lower surface of a first battery tray 210, and another first battery tray 210 may be disposed on a lower surface of the second battery tray 220. Another second battery tray 220 may be disposed on a lower surface of the other first battery tray 210.

The first battery tray 210 and the second battery tray 220 may be formed to be the same as or similar to each other. Hereinafter, for the sake of convenience, the first battery tray 210 will be mainly explained in detail.

The first battery tray 210 may include a first tray housing 211 having an internal space. The first tray housing 211 may be formed of a plurality of plates. For example, the plurality of plates may be integrally formed; be coupled by, for example, screws bolts; or be coupled by, for example, welding.

A first unit battery pack 212 may be inserted into the first tray housing 211. The first unit battery pack 212 may be any of various types of batteries including a primary battery and a secondary battery. For the sake of convenience, a case where the first unit battery pack 212 is a secondary battery will now be described in detail.

A plurality of the first unit battery packs 212 may be inserted into the first tray housing 211 and may be connected to each other serially or in parallel by a first busbar (not shown). A plurality of the first busbars may be provided. The first busbars disposed at the both ends of the first tray housing 211 may perform as a first power terminal (not labeled) of the first battery tray 210.

The first power terminal may include a first positive electrode terminal 213 disposed to project from a first end of the first tray housing 211, and a first negative electrode terminal 214 disposed to project from a second end of the first tray housing 211.

The rack housing assembly 100 may include the rack housing 110 and a rack shelf 120. The rack housing 110 may include a support frame 111 having an inner space and supporting the rack housing 110 against an external force. The rack housing 110 may also include a cover frame 112 and a bottom frame 113 respectively forming a top and a bottom of the rack housing 110 and extending in a horizontal direction Z3. The rack housing 110 may also include a lateral frame 114 extending between the cover frame 112 and the bottom frame 113 in a vertical direction Z1.

The frame members 112, 113 and 114 may form the outer appearance of the rack housing 110, which may be a substantially cubic shape. For example, the support frame 111 may be formed of the plurality of frames to maintain an inner space within the rack housing 110 and may be designed to protect the rack housing 110 from, for example, an external shock.

The cover frame 112 and the bottom frame 113 extend in the horizontal direction Z3 at the top and bottom of the rack housing 110, respectively, and the lateral frame 114 may extend in the vertical direction Z1 between the cover frame 112 and the bottom frame 113 to connect the cover frame 112 and the bottom frame 113. The lateral frame 114 may extend in the vertical direction Z1 across the side surfaces of accommodation spaces G in which the plurality of battery trays 200 are accommodated, and define a column of the accommodation spaces G along the vertical direction Z1. The lateral frame 114 may be provided in the vertical direction Z1 between two neighboring columns of the accommodation spaces G, and the two columns of accommodation spaces G in the vertical direction Z1 may be separated. In an embodiment, the accommodation spaces G may be formed in a single column. Hereinafter, for the sake of convenience, the case where the accommodation space G is a single column will be described in detail.

The cover frame 112, the bottom frame 113, and the lateral frame 114 may be formed as separate members and then coupled to the support frame 111 to form a frame of the rack housing 110. The cover frame 112, the bottom frame 113, the lateral frame 114, and the support frame 111 may be coupled to each other by using a permanent coupling method such as welding or may be detachably coupled by using a mechanical coupling method such as screw coupling.

In an embodiment, the frame of the rack housing 110 may be integrally formed. The cover frame 112, the bottom frame 113, and the lateral frame 114 may be formed by perpendicularly bending a plate having a substantially plate shape several times. The frame of the rack housing 110 may be formed by finally coupling the plate to the support frame 111.

Each of the cover frame 112 and the bottom frame 113 may have a substantially rectangular shape with a pair of long sides and a pair of short sides. The cover frame 112 and the bottom frame 113 may form the top and the bottom of the rack housing 110, respectively.

The bottom frame 113 may protect the battery trays 200 housed in the rack housing 110 from external shock, perform a function of a stand for transfer equipment to facilitate a transfer, and include a fork insertion portion (not shown) into which a fork of transfer equipment is inserted. The fork insertion portion may be formed in the lower portion of the bottom frame 11. The whole or part of the bottom frame 113 may be formed of a non-metal based material for a vibration resistant design. The bottom frame 113 may include a plurality of leg members 113a to support the rack housing 110 in an upright posture. The leg members 113a may form a part of the bottom frame 113. For example, the leg members 113a may support the rack housing 110 against a bottom surface (not shown) and be formed in various shapes as long as the leg members 113a contact the bottom surface.

Although not shown in the drawings, a circuit configuration such as a battery management system (BMS) for generally controlling the plurality of battery trays 200 housed in the rack housing 110 may be provided in the upper portion of the cover frame 112.

A plurality of the rack shelves 120 may be arranged at regular intervals in the vertical direction Z1 of the rack housing 110 to provide the accommodation spaces G to the battery trays 200. The rack shelves 120 may be coupled to an inner wall of the rack housing 110, for example, to an inner wall of the lateral frame 114 or to the support frame 111, and may be fixed to the inside of the rack housing 110 by using a mechanical method such as screw coupling. For example, flange portions may be provided at both sides of each of the rack shelves 120, and the rack shelves 120 may be fixed to the rack housing 110 by coupling members such as, for example, screws or nuts, that penetrate through the flange portions and are then inserted into the lateral frame 114. The rack shelves 120 uphold and support the battery trays 200 and may be disposed between the battery trays 200 arranged in the vertical direction Z1, and the accommodation spaces G may be partitioned.

As shown in the drawings, the front side of the accommodation spaces G may form an opening that is open to the outside. The battery trays 200 inserted through the opening may be guided by the frame members 112, 113, and 114, and the rack shelves 120 dividing the accommodation spaces G, and may be accommodated on the rack shelves 120 while sliding on the rack shelves 120. The rack housing 110 may have the opening formed at the front side thereof to allow the battery trays 200 to be inserted therethrough, and a back circuit board (not shown) at the rear side thereof to be electrically connected to the battery trays 200. The battery trays 200 inserted via the front side of the rack housing 110 may slide and reach the back circuit board provided at the rear side of the accommodation spaces G. The battery trays 200 may be electrically coupled to the back circuit board at the position of the back circuit board, and coupling positions may be defined.

Although not shown in the drawings, a restriction unit, for example, a restriction bar (not shown), may be provided at the opening formed at the front side of the rack housing 110, and the battery trays 200 may be prevented from being removed or escaping.

A group of the battery trays 200 may be arranged in at least one column in the vertical direction Z1 in the rack housing 110.

An air-cooling type heat dissipation structure may be applied to the rack housing 110 in order to achieve heat dissipation of the battery trays 200. As shown in FIG. 1, a first vent hole (not labeled) may be formed on one side of each of the battery trays 200, for example, an upper surface thereof, to introduce external air at low temperature into the rack housing 110, and a cooling fan (not shown) may be provided inside or outside the first vent hole. As the cooling fan forcibly introduces external air at low temperature into each of the battery trays 200, external air at low temperature introduced by the cooling fan may turn into air at high temperature by heat transfer while flowing through the inside of the rack housing 110, and then may be exhausted to the outside along the air flow.

In an embodiment, the cooling fan may be provided at the front surface of each of the battery trays 200, and the air flow by the cooling fan may be directed to the inside of each of the battery trays 200 through the opening of the rack housing 110 and the first vent hole of each of the battery trays 200. First vent holes may be respectively formed at front and rear surfaces of each of the battery trays 200 to facilitate the forced air flows in the forward and backward direction. The aforementioned examples provide exemplary positions of the cooling fan.

The front side of the rack housing 110 may formed as an opening, and external air at low temperature may be smoothly introduced into the rack housing 110 without flow resistance. The back circuit board may be provided at the rear surface of the rack housing 110, and may be electrically connected to the battery trays 200. The back circuit board and rack housing 110 form a predetermined opening space (not shown) at the rear surface of the rack housing 110 to exhaust air smoothly. The back circuit board may partially form the predetermined opening space without completely closing the rear surface of the rack housing 110, and the predetermined opening space may be formed between the back circuit board and each of the rack shelves 120.

A plurality of second vent holes (not shown) may be formed on each of the rack shelves 120 supporting the battery trays 200. The heat accumulated inside the rack housing 110 may flow upward due to buoyancy. At this time, the heat may flow via the second vent holes of each of the rack shelves 120 and may be exhausted to the outside through the first vent hole of each of the battery trays 200.

The rack shelves 120 may partition the inner space of the rack housing 110. The plurality of the rack shelves 120 may be provided and arranged to be spaced apart from each other in the vertical direction Z1, as described above.

Each rack shelf 120 may be formed asymmetrically around, e.g., about, a center C. For example, a first distance S1, that is the distance from the center C to one end of the rack shelf 120, may be formed shorter than a second distance S2 that denotes the distance from the center C to a second end of the rack shelf 120.

The first distance S1 may be the same as a distance S4 that is the distance from the center C of each battery tray 200 to the end of the power terminal of the battery tray 200. For example, the first distance S1 may be the same as the distance S4 from the center C of the battery tray 200 to a positive electrode terminal 214 or 224 or a negative electrode terminal 213 or 223.

On the other side, the second distance S2 may be formed shorter than the distance S4 that is the distance from the center C of the battery tray 200 to the end of the power terminal of the battery tray 200.

The length of the rack shelf 120 may be formed shorter than a distance between the end of the positive electrode terminal 214 or 224 and the end of the negative electrode terminal 213 or 223.

The rack shelves 120 may include first rack shelves 121 and second rack shelves 122. The first rack shelves 121 and the second rack shelves 122 may be stacked alternately in the rack housing 110. Each first rack shelf 121 and each second rack shelf 122 may be arranged to be spaced apart from each other in the vertical direction Z1 (for example, the length direction of the rack housing 110). For example, a first rack shelf 121 may be disposed at the higher position than the second rack shelf 122, and another first rack shelf 121 may be disposed under the second rack shelf 122. Another second rack shelf 122 may be disposed under the other first rack shelf 121. The first rack shelves 121 and the second rack shelves 122 may be arranged in the rack housing 110 to repeatedly form the above position.

The first rack shelf 121 and the second rack shelf 122 may be disposed to partially overlap with each other. For example, the first rack shelf 121 and the second rack shelf 122 may overlap with each other. The first rack shelf 121 and the second rack shelf 122 may be disposed such that a first end P1 of the first rack shelf 121 further protrudes in comparison with the a corresponding first end P2 of the second rack shelf 122. The first rack shelf 121 and the second rack shelf 122 may be disposed in the rack housing 110 such that a second end P4 of the second rack shelf 122 further protrudes in comparison with a corresponding second end P3 of the first rack shelf 121.

The bus members 300 may serially connect the stacked battery trays 200, and the plurality of bus members 300 may be provided. For example, the plurality of bus members 300 may be disposed at a first end of the stacked battery trays 200, and the plurality of bus members 300 may include first bus members 310 that electrically connect the stacked battery trays 200 to each other. The plurality of bus members 300 may include second bus members 320 disposed on a side of battery trays 200 opposite to the first bus members 310 and connected to a second end of the stacked battery trays 200.

Each first bus member 310 may connect a first positive electrode terminal 213 of a first battery tray 210 to a second negative electrode terminal 224 of a second battery tray 220, and each second bus member 320 may connect a second positive electrode terminal 223 of the second battery tray 220 to a first negative electrode terminal 214 of a first battery tray 210 disposed under the second battery tray 220. The first bus members 310 and the second bus members 320 may alternate with each other, and the battery trays 200 that are stacked may be serially connected.

A current blocking device 400 may be provided on at least one selected from the plurality of bus members 300. If excess current is supplied to the bus member 300, the current blocking device 400 may disconnect the bus member 300 to prevent the energy storage apparatus 10 from malfunctioning or being damaged.

In the process of installing or manufacturing the energy storage apparatus 10 as described above, the first bus members 310 and the second bus members 320 may be arranged in the same line. When the first bus members 310 and the second bus members 320 directly contact each other, or when the first bus members 310 and the second bus members 320 contact each other via, for example, a foreign material, excess current may be supplied thereto and then a short may occur, leading to, for example, a fire. In an embodiment, the first bus members 310 and the second bus members 320 may be disposed at different positions to help prevent, for example, excess current being supplied thereto.

First bus members 310 and second bus members 320 may be disposed to face each other with battery trays 200 interposed therebetween. For example, if the first bus member 310 is disposed at a first end of the battery tray 200, the second bus member 320 may be disposed at a second end of the battery tray 200. In an embodiment, the first bus member 310 may be disposed at a second end of the battery tray 200, and the second bus member 320 may be disposed at a first end of the battery tray 200. Hereinafter, for the sake of convenience, the case where the first bus member 310 is disposed at a second end of the battery tray 200, and the second bus member 320 is disposed at a first end of the battery tray 200 will be explained in detail.

The first bus member 310 may be disposed at the opening that is the front surface of the rack housing 110, and the second bus member 320 may be disposed at the rear surface of the rack housing 110.

The first bus member 310 and the second bus member 320 may be disposed at different heights. For example, the first bus member 310 may be disposed at a higher position than a position of the second bus member 320.

In the process of installing or assembling the energy storage apparatus 10 as described above, at least one selected from each first rack shelf 121 and each second rack shelf 122 may determine the exact positions of the first bus member 310 and the second bus member 320.

For example, if the energy storage apparatus 10 is provided outside, the rack housing assembly 100 may be fixed to, for example, an external structure or the ground surface. Then, the battery trays 200 may be inserted into the rack housing 110. Each of the battery trays 200 may be inserted into each of the rack shelves 120.

A first battery tray 210 may be disposed on a first rack shelf 121, and a second battery tray 220 disposed under the first battery tray 210 may be disposed on a second rack shelf 122. Another first battery tray 210 disposed under the second battery tray 220 may be disposed on another first rack shelf 121 arranged under the second rack shelf 122, and the first battery trays 210 and the second battery trays 220 may alternate with each other.

After disposing the first battery trays 210 and the second battery trays 220 in the above-described manner, the first bus members 310 and the second bus members 320 may be disposed thereon. The first bus member 310, as described above, may be disposed at a second side of first battery tray 210. The second bus member 320 may be disposed at a first side of the second battery tray 220.

If the first bus member 310 and the second bus member 320 are disposed in the above-described manner, each of the first bus member 310 and the second bus member 320 does not overlap with each of the first rack shelf 121 and the second rack shelf 122, respectively, and may be easily disposed.

If an attempt were made to dispose the first bus member 310 by connecting a first side of the first rack shelf 121 and a first side of the second rack shelf 122, or to dispose the second bus member 320 by connecting a second side of the first rack shelf 121 and a second side of the second rack shelf 122, the first bus member 310 or the second bus member 320 would be blocked by the first rack shelf 121 or the second rack shelf 122, respectively, and it therefore may not be possible to properly position the bus member.

If the first bus member 310 is disposed at a first side of the first rack shelf 121, the first bus member 310 may be connected to the first negative electrode terminal 214 and a second positive electrode terminal 223 of the second battery tray 220. The first bus member 310 may be disposed inward of a straight line that connects an end of the first negative electrode terminal 214 and an end of the second positive electrode terminal 223. The first distance S1 of the first rack shelf 121 may be the same as the distance from the center C of the first battery tray 210 to the end of the first negative electrode terminal 214, the position of the first bus member 310 may be determined within the second distance S2, and the physical arrangement of the first bus member 310 may not be possible unless the shape of the first bus member 310 is changed.

In the rack housing assembly 100 and the energy storage apparatus 10, when the stacked battery trays 200 are connected to each other, a short that may occur when the bus members are arranged in a single straight line may be prevented.

In the rack housing assembly 100 and the energy storage apparatus 10, when the bus member 300 is mislocated during assembly, an assembler may notice the mislocation of the bus member 300 and may prevent an incorrect assembly.

As described above, according to the one or more of the above embodiments, a short may be prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rack housing assembly, comprising:
a rack housing that defines a plurality of accommodation spaces opened at a front side to accommodate a plurality of battery trays that are vertically stacked; and
a rack shelf that is in an inner space of the rack housing to house a battery tray and divides the plurality of accommodation spaces, the rack shelf including first, second, third, and fourth rack shelves that support the plurality of battery trays,
the rack shelf being so dimensioned and positioned in the inner space of the rack housing as to block a misconnection in a vertical direction of a bus member that serially connects each of the plurality of battery trays stacked in the rack housing to each other, wherein
the first, second, third, and fourth rack shelves are a same shape, and are vertically stacked in a zigzag shape.

2. The rack housing assembly as claimed in claim 1, wherein:
the first, second, third, and fourth rack shelves are in the rack housing,
front ends of the first and third rack shelves protrude in comparison with front ends of the second and fourth rack shelves, and
rear ends of the second and fourth rack shelves protrude in comparison with rear ends of the first and third rack shelves.

3. The rack housing assembly as claimed in claim 2, wherein a bus member is at the rear end of the first rack shelf or at the front end of the second rack shelf.

4. The rack housing assembly as claimed in claim 1, wherein the first rack shelf and the second rack shelf are alternately disposed in the rack housing in a length direction of the rack housing.

5. The rack housing assembly as claimed in claim 1, wherein at least one selected from a first end of the first rack shelf and a second end of the second rack shelf is aligned with an end of a power terminal of each of the plurality of battery trays.

6. The rack housing assembly as claimed in claim 1, wherein the rack shelf is asymmetrical around a center of each of the plurality of battery trays.

7. The rack housing assembly as claimed in claim 1, wherein a length of the rack shelf is shorter than a distance between two power terminals of each of the plurality of battery trays.

8. An energy storage apparatus, comprising:
a plurality of battery trays including power terminals at opposite sides thereof;
a rack housing that define a plurality of accommodation spaces opened at a front side to accommodate the plurality of battery trays;
a rack shelf that is in the rack housing and sections the plurality of the accommodation spaces to house the plurality of battery trays, the rack shelf including first, second, third, and fourth rack shelves that support the plurality of battery trays; and
a bus member that connects power terminals of two adjacent battery trays among the plurality of battery trays,
a first distance from a center of a battery tray to a first end of the rack shelf being smaller than a second distance from the center of the battery tray to a second end of the rack shelf, a misconnection of the two adjacent vertically stacked battery trays with the bus member being blocked by the second end of the rack shelf, wherein
the first, second, third, and fourth rack shelves are a same shape, and are vertically stacked in a zigzag shape.

9. The energy storage apparatus as claimed in claim 8, comprising a plurality of bus members that connect the two adjacent battery trays, the plurality of bus members including:
a first bus member that is at the second end of each of the plurality of battery trays and electrically connects the plurality of battery trays to each other; and
a second bus member that is opposite to the first bus member with respect to the center of the plurality of battery trays, and connects to the first end of each of the plurality of battery trays.

10. The energy storage apparatus as claimed in claim 9, wherein the first bus member and the second bus member serially connect the plurality of battery trays.

11. The energy storage apparatus as claimed in claim 10, wherein the first rack shelf and the second rack shelf are alternately disposed in the rack housing in a length direction of the rack housing.

12. The energy storage apparatus as claimed in claim 10, wherein:

the first rack shelf and the second rack shelf are in the rack housing, front ends of the first and third rack shelves protrude in comparison with front ends of the second and fourth rack shelves, and rear ends of the second and fourth rack shelves protrude in comparison with rear ends of the first and third rack shelves.

13. The energy storage apparatus as claimed in claim 12, wherein the bus member is at the rear end of the first rack shelf or at the front end of the second rack shelf.

14. The energy storage apparatus as claimed in claim 8, wherein the first distance is the same as a distance from the center of the battery trays to each end of the power terminals of the battery tray.

15. The energy storage apparatus as claimed in claim 8, further comprising a current blocking device on the bus member.

16. The energy storage apparatus as claimed in claim 8, wherein the bus member is at the second end of the rack shelf.

17. The energy storage apparatus as claimed in claim 8, wherein the rack shelf prevents a short of the bus member.

* * * * *